United States Patent
Mills et al.

(10) Patent No.: US 6,731,934 B1
(45) Date of Patent: May 4, 2004

(54) WIRELESS COMMUNICATIONS NETWORK, HOME LOCATION REGISTER AND METHOD HAVING AN IMPROVED SIGNAL STRENGTH ARBITRATION SCHEME

(75) Inventors: Kevin M. Mills, Bergheim, TX (US); Zia U. Haque, Plano, TX (US)

(73) Assignee: Alcatel, Paris (FR)

( * ) Notice: Subject to any disclaimer, the term of this patent is extended or adjusted under 35 U.S.C. 154(b) by 567 days.

(21) Appl. No.: 09/779,951

(22) Filed: Feb. 9, 2001

(51) Int. Cl.[7] .................................................. H04Q 7/20
(52) U.S. Cl. ...................... 455/433; 455/435.1; 455/560
(58) Field of Search .............................. 455/432.1, 433, 455/435.1, 560, 226.1, 226.2, 517

(56) References Cited

U.S. PATENT DOCUMENTS 5,257,399 A * 10/1993 Kallin et al. ................. 455/434
6,282,421 B1 * 8/2001 Chatterjee et al. ........ 455/435.1

OTHER PUBLICATIONS

TIA/EIA–41–D Standard entitled "Cellular Radiotelecommunications Intersystem Operations", pp. 6–463 through 6–469, dated Dec. 1997.

* cited by examiner

Primary Examiner—Nguyen T. Vo
Assistant Examiner—Alemayehu Behulu
(74) Attorney, Agent, or Firm—Law Offices of William J. Tucker; Craig A. Hoersten; V. Lawrence Sewell

(57) ABSTRACT

A wireless communications network, a home location register and a method are provided that have an improved signal strength arbitration scheme which can ensure that a mobile terminal is registered at the most appropriate mobile switching center. In particular, the home location register includes a database coupled to a processor capable of implementing a signal strength arbitration scheme that assigns a provisional quality value to a registration signal that was received from a mobile switching center which failed to include a quality parameter within the registration signal, wherein that mobile switching center may now be considered and possibly registered as the most appropriate mobile switching center to process a wireless call of a mobile terminal that broadcasted a registration access signal to a plurality of mobile switching centers. The most appropriate mobile switching center is often the mobile switching center that has the highest quality value included within or assigned to the registration signal it forwarded to the home location register.

22 Claims, 4 Drawing Sheets

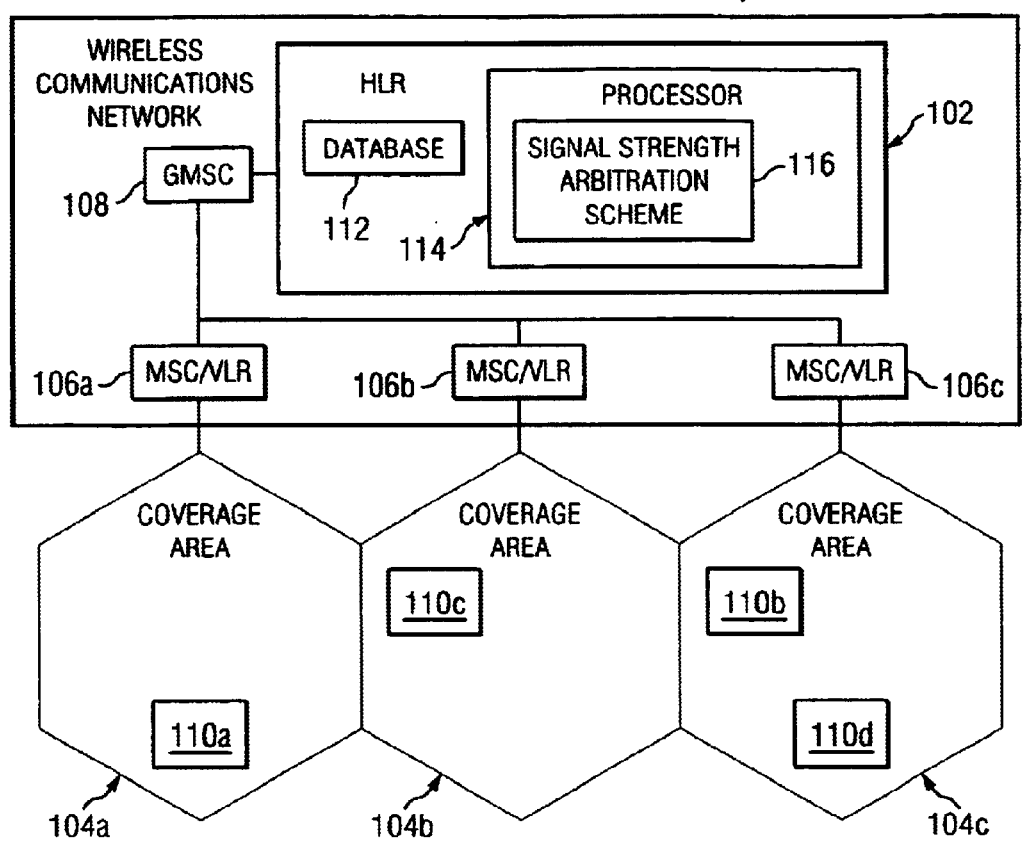
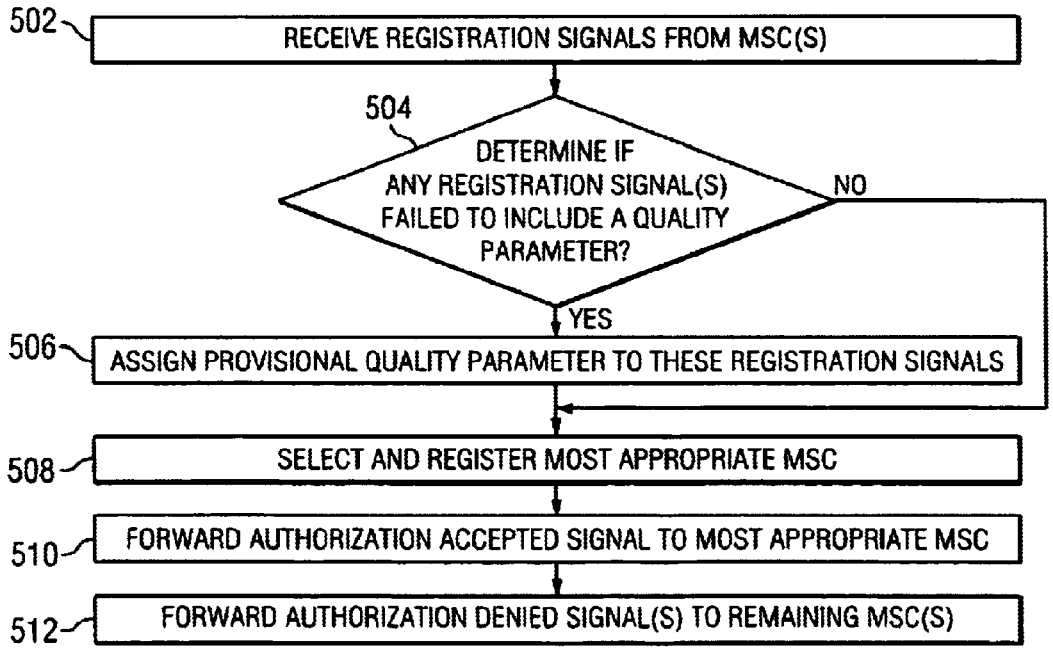

WIRELESS COMMUNICATIONS NETWORK, HOME LOCATION REGISTER AND METHOD HAVING AN IMPROVED SIGNAL STRENGTH ARBITRATION SCHEME

BACKGROUND OF THE INVENTION

1. Field of the Invention

The present invention relates in general to the telecommunications field and, in particular, to a wireless communications network, home location register and method for improving a signal strength arbitration scheme to ensure that a mobile terminal is registered at the most appropriate mobile switching center.

2. Background of the Invention

In the telecommunications field, one of the more significant design challenges today involves the development of new signal strength arbitration schemes which can ensure that a mobile terminal is registered to receive and initiate wireless calls with the most appropriate mobile switching center. In the past, a mobile terminal would broadcast a registration access signal that could be received by one or more mobile switching centers (MSCs). These MSCs would forward a registration signal containing information associated with the received registration signal to a home location register (HLR). At this time, the HLRs did not implement a signal strength arbitration scheme for sorting through all the registration signals received from multiple MSCs and, as such, the HLR could register the mobile terminal with a MSC that received a registration access signal having the lowest signal strength of all the received registration access signals. Of course, the MSC that received the registration access signal having the lowest signal strength is not likely to be the most appropriate MSC to support the wireless calls of the mobile terminal. In addition, the HLRs at this time often registered a mobile terminal at multiple MSCs which is not a productive use of valuable resources in a wireless communications network.

Today, most HLRs implement a signal strength arbitration scheme that can collect several registration signals from MSCs and then attempt to select the best MSC on which to register a mobile terminal (see, e.g., TIA/EIA Standard 41.6-D Annex F, dated December 1997). The problem with HLRs that implement the traditional signal strength arbitration schemes, is that the traditional signal strength arbitration scheme requires that the registration signals received by the HLR include an IS41-D parameter known as the ReceivedSignalQuality parameter. If the traditional HLR receives registration signals that contain this ReceivedSignalQuality parameter then the traditional signal strength arbitration schemes would work properly in selecting the best MSC on which to register a mobile terminal. However, traditional HLRs often receive registration signals from MSCs that do not contain the ReceivedSignalQuality parameters and there are no signal strength arbitration schemes currently available that can adequately deal with received registration signals that do not have the ReceivedSignalQuality parameters. In other words, a MSC that transmits a registration signal that fails to contain the ReceivedSignalQuality parameter is not going to be selected by the HLR to service the mobile terminal even though that MSC may be the best MSC on which to register the mobile terminal. In fact, that MSC may be the only MSC that can service the mobile terminal but still it is not registered by the traditional HLR to service the mobile terminal. Accordingly, there is an existing need for a wireless communications network, a home location register and a method that has an improved signal strength arbitration scheme which can ensure that a mobile terminal is registered at the most appropriate mobile switching center. This need and other needs are satisfied by the wireless communications network, home location register and method of the present invention.

BRIEF DESCRIPTION OF THE INVENTION

The present invention includes a wireless communications network, a home location register and a method having an improved signal strength arbitration scheme which can ensure that a mobile terminal is registered at the most appropriate mobile switching center. In particular, the home location register includes a database coupled to a processor capable of implementing a signal strength arbitration scheme that assigns a provisional quality value to a registration signal that was received from a mobile switching center which failed to include a quality parameter within the registration signal, wherein that mobile switching center may now be considered and possibly registered as the most appropriate mobile switching center to process a wireless call of a mobile terminal that broadcasted a registration access signal to a plurality of mobile switching centers. The most appropriate mobile switching center is often the mobile switching center that has the highest quality value included within or assigned to the registration signal it forwarded to the home location register.

BRIEF DESCRIPTION OF THE DRAWINGS

A more complete understanding of the present invention may be had by reference to the following detailed description when taken in conjunction with the accompanying drawings wherein:

FIG. 1 is a block diagram illustrating the basic components of a wireless communications network and a home location register of the present invention;

FIG. 5 is a flowchart illustrating the steps of a preferred method in accordance with the present invention.

DETAILED DESCRIPTION OF THE DRAWINGS

Figure 2:
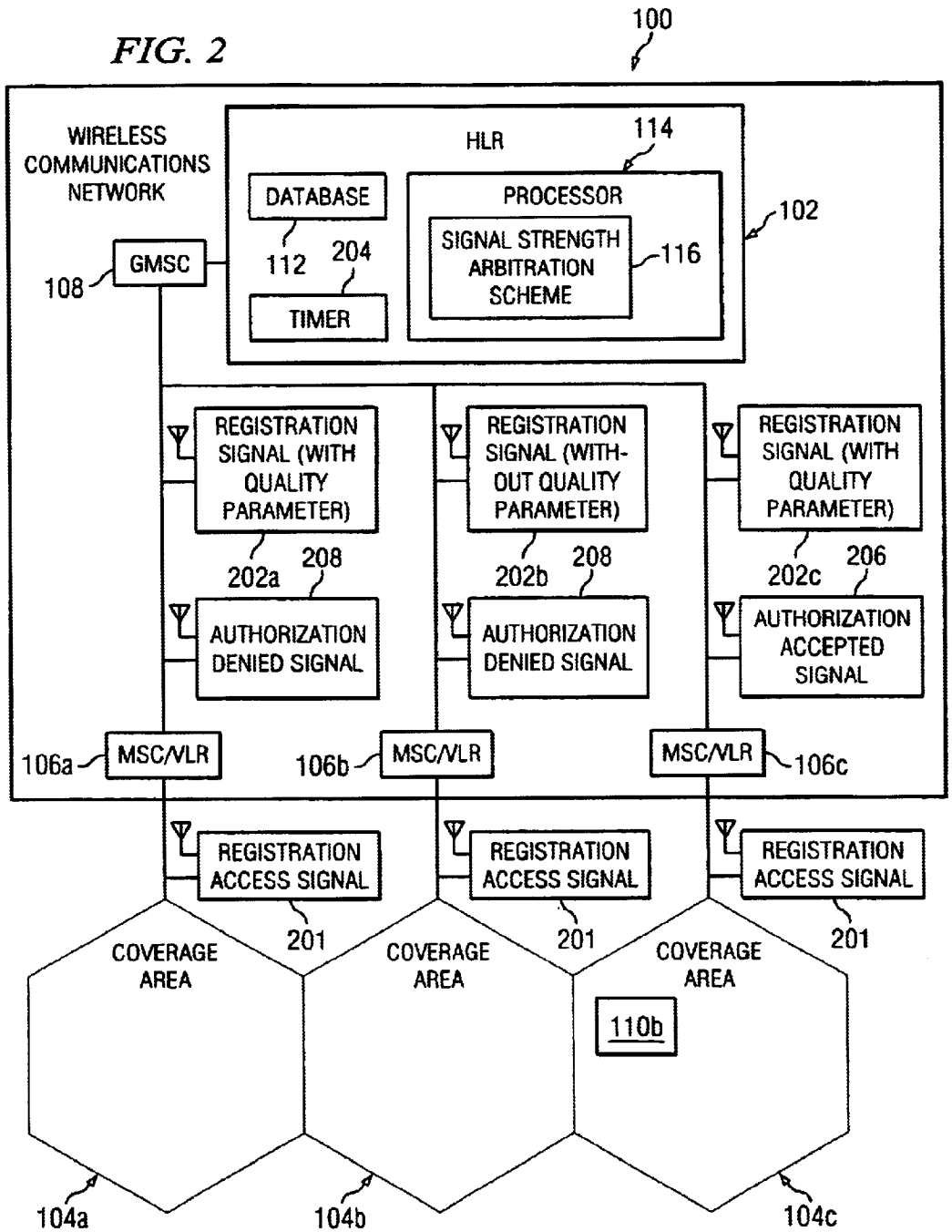
FIG. 2 is a block diagram illustrating one example how the home location register shown in FIG. 1 can ensure that a mobile terminal is registered at the most appropriate mobile switching center.

Referring to FIGS. 1–5, there are disclosed an exemplary wireless communications network 100, an exemplary home location register 102 and a preferred method 500 in accordance with the present invention.

Referring to FIG. 1, there is a block diagram illustrating the basic components of the wireless communications network 100 and the home location register 102. Certain details associated with the wireless communications network 100 are known in the industry and as such need not be described. Therefore, for clarity, the description provided below in relation to the wireless communications network 100 omits some components such as base stations that are not necessary to understand the invention.

The wireless communications network 100 can service a large geographic area that has been divided into radio coverage areas 104a, 104b and 104c (only three shown). Each radio coverage area 104a, 104b and 104c is respectively managed by a mobile switching center/visitor location register (MSC/VLR) 106a, 106b and 106c (only three shown). The MSC/VLRs 106a, 106b and 106c are managed by a gateway mobile switching center (GMSC) 108 which is typically connected to a public switched telephone network (PSTN) (not shown).

The GMSC 108 also interacts with the HLR 102 which can select and keep track of which MSC/VLR 106a, 106b or 106C each mobile terminal 110a, 110b, 110c and 110d (only four shown) is registered with to receive and initiate wireless calls. The HLR 102 is able to do this because each mobile terminal 110a, 110b, 110c and 110d is required to broadcast at predetermined intervals a registration access signal that can be received by one or more MSC/VLRs 106a, 106b and 106c. These MSC/VLRs 106a, 106b and 106c then transmit a registration signal to inform the HLR 102 that they have received a registration access signal from a particular mobile terminal 110a, 110b, 110c and 110d. However, unlike the traditional HLR, the HLR 102 of the present is able to consider and possibly register a mobile terminal with a MSC/VLR that provided the HLR 102 with a registration signal that does not contain a ReceivedSignalQuality parameter (e.g., quality parameter).

Basically, the HLR 102 has a signal strength arbitration scheme 116 which functions to ensure that a mobile terminal is registered at the most appropriate MSC/VLR. In particular, the HLR 102 includes a database 112 coupled to a processor 114 capable of implementing the signal strength arbitration scheme 116 which assigns a provisional quality value to a registration signal that was received from a mobile switching center which failed to include a quality parameter within the registration signal, wherein that mobile switching center may now be considered and registered as the most appropriate mobile switching center to process a wireless call of a mobile terminal that broadcasted a registration access signal to a plurality of mobile switching centers. The most appropriate mobile switching center is often the mobile switching center that has the highest quality value included within or assigned to the registration signal it forwarded to the home location register. Several different examples are provided below that describe how the present invention can operate to select and register the most appropriate MSC/VLR to service a mobile terminal when at least one of the registration signals received by the HLR 202 fails to have a quality parameter.

Referring to FIG. 2, there is a block diagram illustrating one example how the HLR 102 can ensure that a mobile terminal 110a, 110b, 110c or 110d is registered at the most appropriate MSC/VLR 106a, 106b or 106c. As illustrated, each of the MSC/VLRs 106a, 106b and 106c receives a registration access signal 201 broadcasted from mobile terminal 110b (only one shown). Upon receiving the registration access signal 201, each MSC/VLR 106a, 106b and 106c respectively generates and forwards a registration signal 202a, 202b and 202c to the HLR 102. Of course, if any of the MSC/VLRs 106a, 106b and 106c did not receive the broadcasted registration access signal 201 then the HLR 102 would not select and register those MSC/VLRs.

In particular, the HLR 102 may start a timer 204 upon receiving the first registration signal 202a (for example) and then for a predetermined duration thereafter additional registration signals 202b and 202c (for example) can be received and processed as a group by the HLR 102. If the HLR 102 did not receive a registration signal(s) during the predetermined duration then those registration signal(s) would not be collected and processed along with the previously received registration signals 202a, 202b and 202c. Instead, those registration signal(s) would be processes at a later time by the HLR 102.

The processor 114 then determines which, if any, of the registration signals 202a, 202b and 202c received from the MSC/VLRs 106a, 106b and 106c failed to have a quality parameter (i.e., ReceivedSignalQuality parameter). As illustrated, the received registration signals 202a and 202c included the quality parameter and the received registration signal 202b did not include the quality parameter. There can be several reasons why MSC/VLR 106b would not forward the quality parameter along with the registration signal 202b to the HLR 102. For instance, the MSC/VLR 106b may not be IS41-D compliant and as such does not support this function, or the owner of MSC/VLR 106b blocks the forwarding of the quality parameter within the registration signal 202b to the HLR 102 whenever there is a roaming mobile terminal 110b.

The processor 114 then assigns a provisional quality value to the received registration signal 202b that failed to have the quality parameter. The provisional quality value assigned can be the minimum reasonable value of signal strength which mobile terminal 110b and MSC/VLR 106b need to process a wireless call. Next, the processor 114 processes the real quality values of registration signals 202a and 202c and the provisional quality value of registration signal 202b and registers the most appropriate MSC/VLR 106a, 106b or 106c to handle the incoming and outgoing wireless calls of the mobile terminal 110b. Assuming, that registration signal 202a has a real quality value lower than the assigned provisional quality value of registration signal 202b which has a quality value less than the real quality value of registration signal 202c, then the most appropriate MSC/VLR selected by the processor 114 in this example would be MSC/VLR 106c. The HLR 102 then forwards an authorization accepted signal 206 to MSC/VLR 106c and also forwards authorization denied signals 208 to MSC/VLRs 106a and 106b. The MSC/VLR 106c then interacts with and handles the wireless calls associated with mobile terminal 110b.

Figure 3:
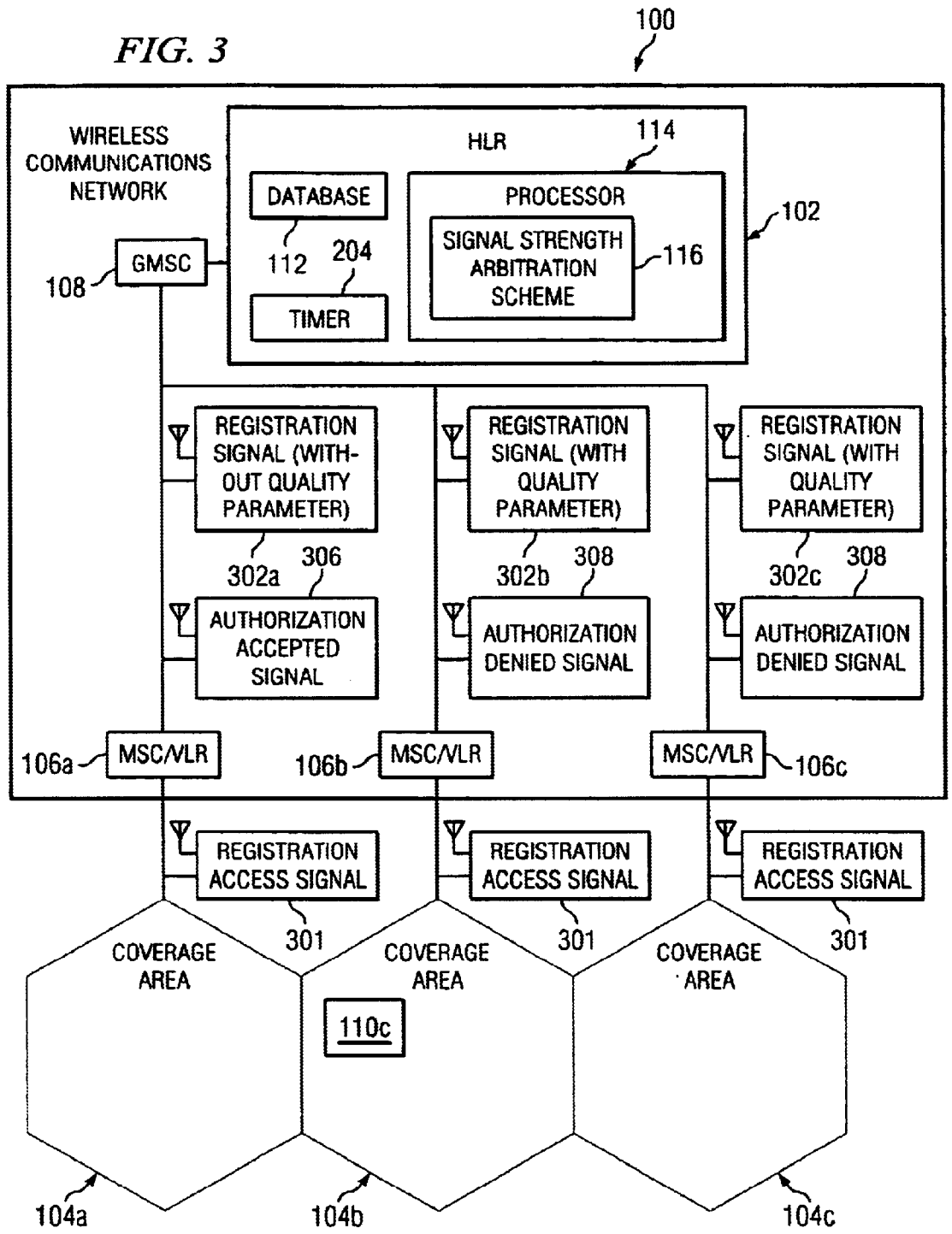
FIG. 3 is a block diagram illustrating another example how the home location register shown in FIG. 1 can ensure that a mobile terminal is registered at the most appropriate mobile switching center.

Referring to FIG. 3, there is a block diagram illustrating another example how the HLR 102 can ensure that a mobile terminal 110a, 110b, 110c or 110d is registered at the most appropriate MSC/VLR 106a, 106b or 106c. As illustrated, each of the MSC/VLRs 106a, 106b and 106c receives a registration access signal 301 broadcasted from mobile terminal 110c (only one shown). Upon receiving the registration access signal 301, each MSC/VLR 106a, 106b and 106c respectively generates and forwards a registration signal 302a, 302b and 302c to the HLR 102. Of course, if any of the MSC/VLRs 106a, 106b and 106c did not receive the broadcasted registration access signal 301 then the HLR 102 would not select and register those MSC/VLRs.

In particular, the HLR 102 may start a timer 204 upon receiving the first registration signal 302a (for example) and then for a predetermined duration thereafter additional registration signals 302b and 302c (for example) can be received and processed as a group by the HLR 102. If the HLR 102 did not receive a registration signal(s) during the predetermined duration then those registration signal(s) would not be collected and processed along with the previously received registration signals 302a, 302b and 302c. Instead, those registration signal(s) would be processes at a later time by the HLR 102.

The processor 114 then determines which, if any, of the registration signals 302a, 302b and 302c received from the MSC/VLRs 106a, 106b and 106c failed to have a quality parameter (e.g., ReceivedSignalQuality parameter). As illustrated, the received registration signals 302b and 302c included the quality parameter and the received registration signal 302a did not include the quality parameter. Again, there can be several reasons why MSC/VLR 106a would not forward the quality parameter along with the registration signal 302a to the HLR 102. For instance, the MSC/VLR 106a may not be IS41-D compliant and as such does not support this function, or the owner of MSC/VLR 106a blocks the forwarding of the quality parameter within the registration signal 302a to the HLR 102 whenever there is a roaming mobile terminal 110c.

The processor 114 then assigns a provisional quality value to the received registration signal 302a that failed to have the quality parameter. The provisional quality value assigned can be the minimum reasonable value of signal strength which mobile terminal 110c and MSC/VLR 106a need to process a wireless call. Next, the processor 114 processes the real quality values of registration signals 302b and 302c and the provisional quality value of registration signal 302a and registers the most appropriate MSC/VLR 106a, 106b or 106c to handle the incoming and outgoing wireless calls of the mobile terminal 110c. Assuming, that registration signal 302a has a provisional quality value that is higher than both of the real quality values of registration signals 302b and 302c, then the most appropriate MSC/VLR selected by the processor 114 in this example would be MSC/VLR 106a. The HLR 102 then forwards an authorization accepted signal 306 to MSC/VLR 106a and also forwards authorization denied signals 308 to MSC/VLRs 106b and 106c. The MSC/VLR 106a then interacts with and handles the wireless calls associated with mobile terminal 110c.

In this example, the HLR 102 does not know for sure if MSC/VLR 106a can handle the wireless calls of mobile terminal 110c, but MSC/VLR 106a is the only MSC/VLR of MSC/VLRs 106a, 106b and 106c that can support the wireless calls of mobile terminal 110c. Because, the quality values associated with the registration signals 302b and 302c are below a minimum threshold thus MSC/VLR 106b and 106c can not effectively support the wireless calls of mobile terminal 110c. The traditional HLR would have never selected and registered MSC/VLR 106a to handle the wireless calls of mobile terminal 110c and, as such, the mobile terminal would not have been serviced.

Figure 4:
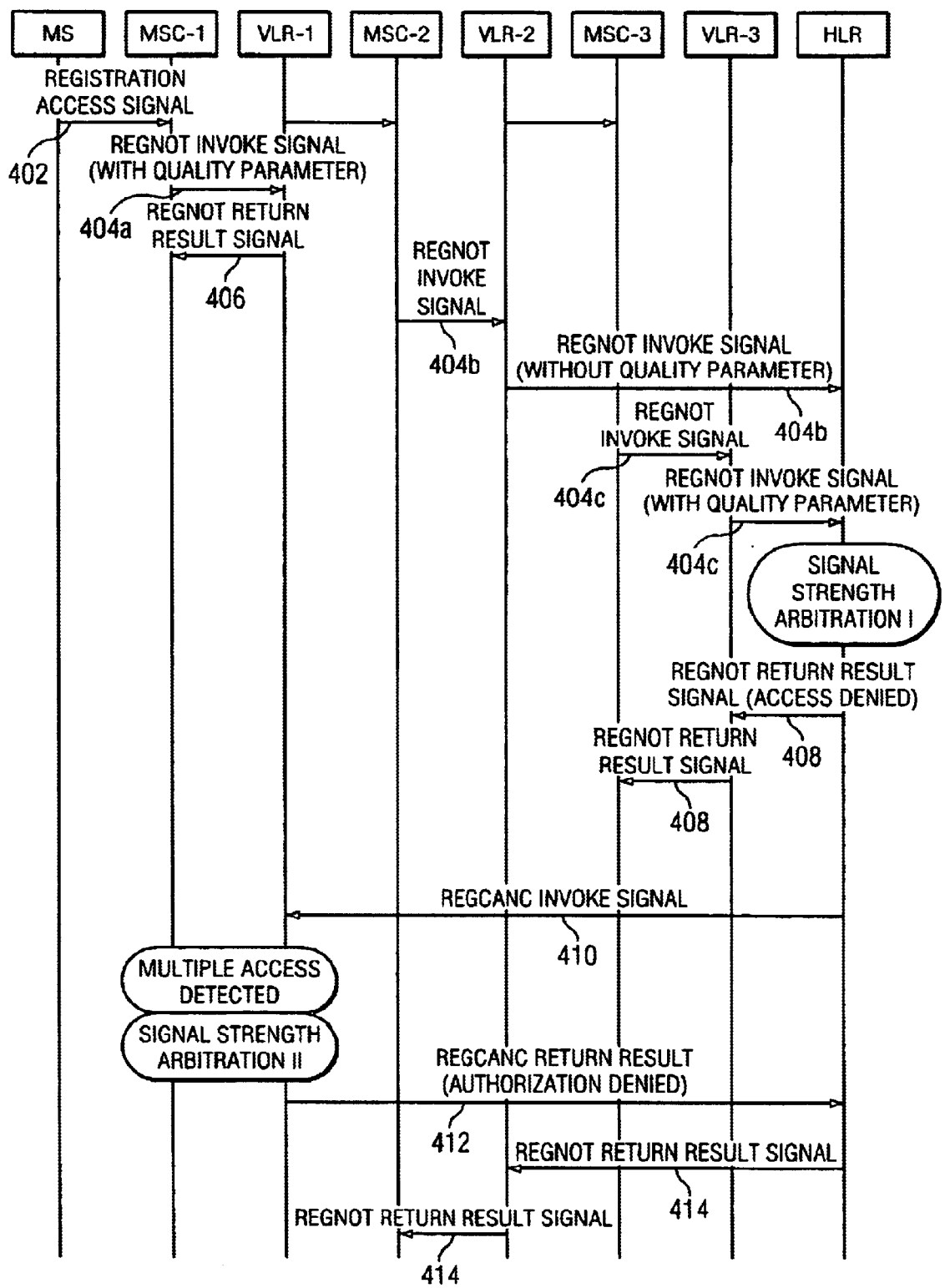
FIG. 4 is a signal sequence chart illustrating yet another example how the home location register shown in FIG. 1 can ensure that a mobile terminal is registered at the most appropriate mobile switching center.

Referring to FIG. 4, there is a signal sequence chart illustrating still yet another example how the HLR can ensure that a mobile terminal is registered at the most appropriate mobile switching center. This signal sequence chart is one representation of how Appendix F.2 in TIA/EIA Standard 41-6D dated December 1997 may read if that standard incorporated the present invention.

MSC-1 (MSCs and VLRs are shown separately in this example) receives a registration access signal 402 (registration signal) from mobile terminal MS. MSC-1 sends a RegistrationNotification INVOKE signal 404a to VLR-1. The RegistrationNotification INVOKE signal 404a contains the ReceivedSignalQuality parameter in addition to ControlChannelData parameters. In this example, MSC-1 does not send the RegistrationNotification INVOKE signal 404a to the HLR since the MS is already registered with MSC-1 and VLR-1. However, VLR-1 internally marks the registration time and stores the signal strength value associated with the registration access signal 402. The VLR-1 accepts the registration by sending a RegistrationNotification RETURN RESULT signal 406 to MSC-1.

MSC-2 overhears the same registration access signal 402 broadcasted by the MS and forwards a RegistrationNotification INVOKE signal 404b to the VLR-2. The VLR-2 then forwards the RegistrationNotification INVOKE signal 404b to the HLR. In this example, the RegistrationNotification INVOKE signal 404b forwarded from VLR-2 to the HLR does not contain a ReceivedSignalQuality parameter. Again, there can be several reasons why a MSC/VLR would not forward the quality parameter along with the RegistrationNotification INVOKE to the HLR. For instance, the MSC/VLR may not be IS41-D compliant and as such does not support this function, or the owner of MSC/VLR blocks the forwarding of the quality parameter within the RegistrationNotification INVOKE signal sent to the HLR whenever there is a roaming MS. At this time, the HLR starts a multiple access timer that typically lasts 3 seconds.

Like MSC-2, MSC-3 also overhears the same registration access signal 402 broadcasted by MS and forwards a RegistrationNotification INVOKE signal 404c to VLR-3. The VLR-3 then forwards the RegistrationNotification INVOKE signal 404c to the HLR. In this example, the RegistrationNotification INVOKE signal 404c forwarded from the VLR-3 to the HLR does contain a ReceivedSignalQuality parameter. It should be understood that the signal quality values associated with the registration access signals 402 received by MSC-1, MSC-2 and MSC-3 are likely to be different, because the transmission paths between the MS and each MSC-1, MSC-2 and MSC-3 are likely to be different.

While the multiple access timer is running, the HLR initiates and completes a signal strength arbitration scheme (shown as signal strength arbitration I). In accordance with the signal strength arbitration scheme, the HLR determines which, if any, of the RegistrationNotification INVOKE signals 404b and 404c received from the MSC-2 and MSC-3 failed to have a ReceivedSignalQuality parameter. In this example, the received RegistrationNotification INVOKE signal 404c included the ReceivedSignalQuality parameter and the received RegistrationNotification INVOKE signal 404b did not include the ReceivedSignalQuality parameter.

If there are any received RegistrationNotification INVOKE signals that failed to include a ReceivedSignalQuality parameter, then the HLR assigns a provisional quality value to these received RegistrationNotification INVOKE signals. In this example, the HLR assigns a provisional quality value to the received RegistrationNotification INVOKE signal 404b. As above, the provisional quality value assigned can be the minimum reasonable value of signal strength which the MS and a MSC/VLR need to process a wireless call.

Thereafter, the HLR processes the real quality value of RegistrationNotification INVOKE signal 404c and the provisional quality value of RegistrationNotification INVOKE signal 404b and selects the most appropriate MSC between MSC-2 and MSC-3 to handle the incoming and outgoing wireless calls of the MS. Assuming, that RegistrationNotification INVOKE signal 404b had a provisional quality value that is higher than the real quality value of the RegistrationNotification INVOKE signal 404c, then the most appropriate MSC between MSC-2 and MSC-3 that would be selected by HLR would be MSC-2. Thereafter, the HLR would send a RegistrationNotification RETURN RESULT signal 408 containing AuthorizationDenied, ReceivedSignalQuality and ControlChannelData parameters to VLR-3. VLR-3 then forwards the RegistrationNotification RETURN RESULT signal 408 to MSC-3.

After the multiple access timer expires, the HLR sends a RegistrationCancellation INVOKE signal 410 to VLR-1.

The RegistrationCancellation INVOKE signal 410 includes the provisional quality parameter and ControlChannelData parameters associated with the received RegistrationNotification INVOKE signal 404b. The VLR-1 by looking at the time stamp of the last received RegistrationNotification INVOKE signal 404a determines that it received the same registration access signal 402.

The VLR-1 then initiates and completes a signal strength arbitration scheme (shown as signal strength arbitration II). In accordance with the signal strength arbitration scheme, VLR-1 compares the received provisional quality parameter to the stored ReceivedSignalQuality parameter associated with the registration access signal 402 received by MSC-1. If. the signal strength parameter received from MSC-2 is the best, MSC-1 would accept the RegistrationCancellation. On the other hand, if the signal strength parameter received from MSC-2 is. not the best, MSC-1 would not accept the RegistrationCancellation. In this example, MSC-1 receives the registration access signal 402 having the best signal strength. As such, MSC-1 sends the HLR a RegistrationCancellation RETURN RESULT signal 412 with CancellationDenied, ReceivedSignalQuality and ControlChannelData parameters which indicate that MSC-1 denies its registration. The HLR then sends a RegistrationNotification RETURN RESULT signal 414 with AuthorizationDenied, ReceivedSignalQuality and ControlChannelData parameters to VLR-2 to indicate that the HLR denies its registration. Lastly, VLR-2 forwards the RegistrationNotification RETURN RESULT signal 414 to MSC-2.

Referring to FIG. 5, there is a flowchart illustrating the steps of a preferred method 500 for ensuring that a mobile terminal is registered at the most appropriate mobile switching center. For clarity, the preferred method 500 described below is done with reference to wireless network 100 and the scenario described above in FIG. 3. Beginning at step 502, the HLR 102 receives registration signals 302a, 302b and 302c from MSC/VLRs 106a, 106b and 106c. Prior to this, each MSC/VLR 106a, 106b and 106c received a registration access signal 301 broadcasted from mobile terminal 110c. Again, if any of the MSC/VLRs 106a, 106b and 106c did not receive the broadcasted registration signal 302 then the HLR 102 would not select and register those MSC/VLRs.

As described above, the HLR 102 may start a timer 204 upon receiving the first registration signal 302a (for example) and then for a predetermined duration thereafter additional registration signals 302b and 302c (for example) can be received and processed as a group by the HLR 102. If the HLR 102 did not receive a registration signal(s) during the predetermined duration then those registration signal(s) would not be collected and processed along with the previously received registration signals 302a, 302b and 302c. Instead, those registration signal(s) would be processes at a later time by the HLR 102.

At step 504, the HLR 102 then determines which, if any, of the registration signals 302a, 302b and 302c received from the MSC/VLRs 106a, 106b and 106c failed to have a quality parameter (e.g., ReceivedSignalQuality parameter). As illustrated in FIG. 3, the registration signals 302b and 302c received by HLR 102 included the quality parameter and the registration signal 302a received by HLR 102 did not include the quality parameter.

If there are any received registration signals that failed to include a quality parameter, then at step 506, the HLR 102 assigns a provisional quality value to these received registration signals 302a (as shown). Again, the provisional quality value assigned can be the minimum reasonable value of signal strength which the mobile terminal 110a and the MSC/VLR 106a need to process a wireless call.

It should also be understood that provisional quality values assigned to two or more received registration signals which failed to include a quality parameter, need not be identical. For instance, if desired, the strengths assigned to vendors MSCs could be slightly higher than roaming MSCs. This would have the affect of biasing the customers onto their own equipment. Another reason might be due to equipment type. For example, suppose that the service provider determines through experience that an MSC from vendor A needs a minimum signal strength of x, whereas an MSC from vendor B works at a lower quality y. By being able to flexibly assign the quality that is assigned to REGNOTs, the service provider has greater flexibility and better precision in configuring the network.

At step 508, the HLR 102 processes the real quality values of registration signals 302b and 302c and the provisional quality value of registration signal 302a and selects the most appropriate MSC/VLR 106a, 106b or 106c to handle the incoming and outgoing wireless calls of mobile terminal 110c. Assuming, that registration signal 302a had a provisional quality value that is higher than both of the real quality values of the registration signals 302b and 302c, then the most appropriate MSC/VLR that would be selected by the HLR 102 in this example would be MSC/VLR 106a.

It should be understood that if two or more registration signals are received by the HLR that do not have a quality parameter, then the HLR would process the first registration signal received without the real quality value and reject the remaining registrations signals that did not have a real quality value.

Lastly, at steps 510 and 512, the HLR 102 forwards (step 510) an authorization accepted signal 306 to MSC/VLR 106a and also forwards (step 512) authorization denied signals 308 to MSC/VLR 106b and 106c. The most appropriate MSC/VLR 106a then attempts to interact with and support the wireless calls associated with the mobile terminal 110a.

In this example, the HLR 102 does not know for sure if MSC/VLR 106a can handle the wireless calls of mobile terminal 110c, but MSC/VLR 106a is the only MSC/VLR of MSC/VLRs 106a, 106b and 106c that can support the wireless calls of mobile terminal 110c. Because, the quality values associated with the registration signals 302b and 302c are below a minimum threshold, the MSC/VLR 106b and 106c can not effectively support the wireless calls of mobile terminal 110c and, as such, the mobile terminal would not be serviced. In multiple Regnot scenarios, the traditional HLR would have never selected and registered MSC/VLR 106a to handle the wireless calls of mobile terminal 110c.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A register, comprising:
   a database; and
   a processor, coupled to said database, capable of implementing a signal strength arbitration scheme that can assign a provisional quality value to a registration signal that was received from a mobile switching center which failed to include a quality parameter within the registration signal, wherein the mobile switching center may now be considered and registered to process a wireless call of a mobile terminal that broadcasted a registration access signal to a plurality of mobile switching centers.

2. The register of claim 1, further comprising a timer capable of timing a duration of the signal strength arbitration calculation.

3. The register of claim 1, wherein said provisional quality value is a minimum reasonable value of signal strength at which the mobile terminal and the mobile switching center can process the wireless call.

4. The register of claim 1, wherein said registration signal is a RegistrationNotification INVOKE signal.

5. The register of claim 1, wherein said quality parameter is a ReceivedSignalQuality parameter in accordance with Interim Standard 41-D.

6. The register of claim 1, wherein said register is a home location register.

7. A method for ensuring that a mobile terminal is registered at the most appropriate mobile switching center, said method comprising the steps of:

receiving a plurality of registration signals from a plurality of mobile switching centers each of which received a registration access signal from said mobile terminal;

determining which, if any, of the registration signals received from the mobile switching centers fails to have a quality parameter;

assigning a provisional quality value to the received registration signals that failed to have the quality parameter; and selecting from the plurality of mobile switching centers the most appropriate mobile switching center at which to register the mobile terminal based on the received registration signals that included the quality parameter and the received registration signal that failed to include the quality parameter but have since been assigned the provisional quality value.

8. The method of claim 7, further comprising the step of forwarding an authorization accepted signal to the most appropriate mobile switching center and forwarding an authorization denied signal to each of the remaining mobile switching centers.

9. The method of claim 7, further comprising the step of establishing a duration of time during which the plurality of registration signals can be received from the plurality of mobile switching centers.

10. The method of claim 7, wherein said provisional quality value is a minimum reasonable value of signal strength at which a wireless call can be processed between the mobile terminal and a mobile switching center.

11. The method of claim 7, wherein said most appropriate mobile switching center is the mobile switching center that has the highest quality value associated with or assigned to the received registration signals.

12. The method of claim 7, wherein the receiving, determining, assigning and selecting are completed within a home location register.

13. The method of claim 7, wherein said received registration signal is a RegistrationNotification INVOKE signal.

14. The method of claim 7, wherein said quality parameter is a ReceivedSignalQuality parameter in accordance with Interim Standard 41-D.

15. A wireless communications network, comprising:

a plurality of mobile switching centers; and a home location register capable of receiving a registration signal from the mobile switching centers that received a registration access signal from a mobile terminal, said home location register is further capable of assigning a provisional quality value to the received registration signals that failed to include a quality parameter, and also capable of selecting from the plurality of mobile switching centers the most appropriate mobile switching center at which to register the mobile terminal based on the received registration signals that included a quality parameter and the received registration signal that failed to include the quality parameter but have since been assigned the provisional quality value.

16. The wireless communications network of claim 15, wherein each mobile switching center includes a visitor location register.

17. The wireless communications network of claim 15, wherein said home location register is further capable of forwarding an authorization accepted signal to the most appropriate mobile switching center and forwarding an authorization denied signal to each of the remaining mobile switching centers.

18. The wireless communications network of claim 15, further comprising the step of establishing a duration of time during which the plurality of registration signals can be received from the plurality of mobile switching centers.

19. The wireless communications network of claim 15, wherein said provisional quality value is a minimum reasonable value of signal strength at which a wireless call can be processed between the mobile terminal and a mobile switching center.

20. The wireless communications network of claim 15, wherein said most appropriate mobile switching center is the mobile switching center that has the highest signal quality value associated with or assigned to the received registration signals.

21. The wireless communications network of claim 15, wherein said received registration signal is a RegistrationNotification INVOKE signal.

22. The wireless communications network of claim 15, wherein said quality parameter is a ReceivedSignalQuality parameter in accordance with Interim Standard 41-D.

* * * * *